United States Patent

[11] 3,630,110

| [72] | Inventor | Jules Louis Jeanneret |
| | | 13-21 Rue Henri Gelin, Niort, France |
| [21] | Appl. No. | 737,418 |
| [22] | Filed | June 17, 1968 |
| [45] | Patented | Dec. 28, 1971 |
| [32] | Priority | June 20, 1967 |
| [33] | | France |
| [31] | | 111097 |

[54] COPYING LATHE
10 Claims, 7 Drawing Figs.

| [52] | U.S. Cl. | 82/14 R |
| [51] | Int. Cl. | B23b 3/28 |
| [50] | Field of Search | 82/14, 14.1, 14.2, 14.3 |

[56] References Cited
UNITED STATES PATENTS

| 1,289,674 | 12/1918 | Coradi | 82/14 |
| 2,713,283 | 7/1955 | Lomazzo | 82/14 |
| 3,225,630 | 12/1965 | Jeaneret | 82/14 |
| 3,015,976 | 1/1962 | Johnson | 82/14 |
| 3,215,011 | 11/1965 | Findeis | 82/14 |
| 3,215,012 | 11/1965 | Huller | 82/14 |
| 3,267,777 | 8/1966 | Cordier | 82/14 |
| 3,269,232 | 8/1966 | Hovis | 82/14 |
| 2,239,413 | 4/1941 | Dewey | 82/14 R |
| 2,691,913 | 10/1954 | Waterson | 82/14 R |
| 2,887,639 | 5/1959 | Dutcher | 82/14 R |

*Primary Examiner*—Gerald A. Dost
*Attorney*—Stevens, Davis, Miller & Mosher

ABSTRACT: A copying lathe having at least one combined copying assembly for machining a workpiece in accordance with an established contour, comprising a transversally movable slide mounted on a slide bar which is swivably mounted on a longitudinally displaceable carriage, the longitudinal position of the carriage being controlled by a first feeler which cooperates with a first said established contour which is to be copied and which contour is fixed to the bed of the lathe to thereby move said carriage, said slide also cooperating with a second said established contour mounted adjacent a second feeler mounted on the carriage, said slide being moved transversally to the axis of the workpiece by means which are independent of the means which moves the carriage.

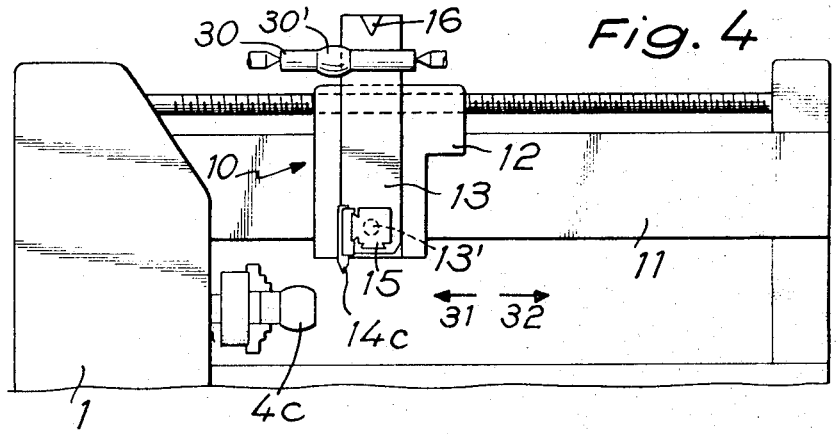
Fig. 4
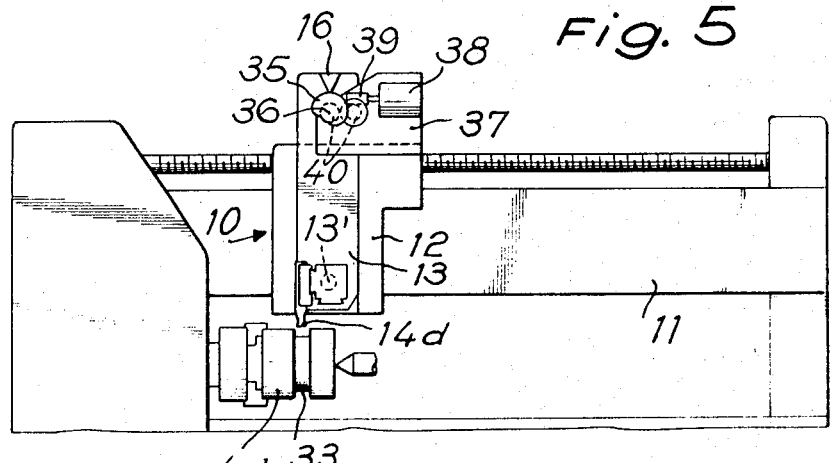
Fig. 5
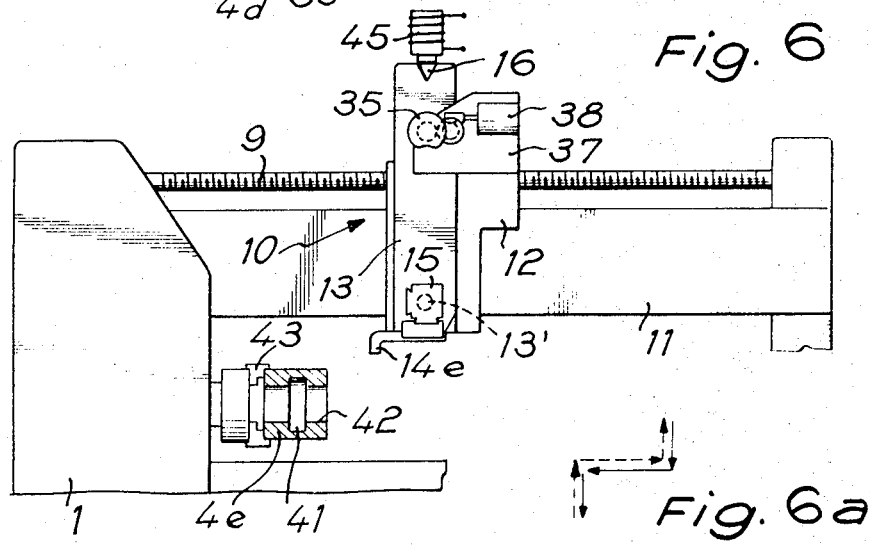
Fig. 6
Fig. 6a

COPYING LATHE

The present invention relates to lathes and more particularly to copying lathes having automatic control cycles.

In the field of lathes it has been the general practice to employ copying means having a carriage which is movable in a direction which is parallel to the axis of the piece to be machined. The carriage is provided with a copying slide transversally or obliquely movable with reference to the axis of the workpiece thereon carrying a cutting tool and feeler means which is applied against the control contour of a template so as to properly determine the spacing of the tool from the axis of the piece to be machined during the longitudinal displacement of the carriage.

In certain types of known copying lathes the control contour is composed of a cam rotatably mounted on an axis fixed to the carriage. This cam is rotated by the longitudinal displacement of the carriage through the means of a transmission which comprises a toothed pinion fixed on the axis of the cam driven by a rack longitudinally disposed on the bed of the lathe. Thus, when the carriage is longitudinally displaced on the bed, the cam is rotated so as to transversally move the carriage. The axis of the cam is mounted on the carriage on a portion of the path followed by the feeler when the copying slide is transversally or obliquely displaced. When the feeler comes in contact with the cam, it is moved by the variations in the radius of this cam which are synchronized with the displacement of the carriage and thus determine the transverse or oblique position of the copying slide for accurately reproducing the chosen contour on the workpiece.

One of the inconveniences of this system is that the contour of the control cam is entirely different than the final contour which is to be reproduced on the workpiece. On other types of presently available lathes, the contour of the control means is preferably the same as that of the workpiece to be reproduced, such as pattern pieces or templates. These contoured control means are mounted on the frame of the lathe and determine the transverse or oblique position of the copying slide with references to axis of the workpiece as a function of the longitudinal position of the carriage. The feeler slides along the contour during the longitudinal advancement of the carriage and acts to reflect the variations in diameter of the pattern piece or the template during the course of this movement. In order to reproduce abrupt contours such as shoulders or faces inclined to the axis of the workpiece between two different diameters, the copying slide is generally obliquely displaced with respect to the axis of the workpiece. It is also known that the slide bars of this copying slide may be mounted so as to swivel on the carriage.

For increasing the speed of such copying operations on workpieces, which is especially desirable when mass-producing an item known lathes have also been provided with two independent copying carriages. These carriages are independently driven, and at least one of the copying slides is capable of being swiveled with respect to the axis of the workpiece. The transverse or oblique movements of these copying slides are controlled from one or several pattern pieces in accordance with the modes of realization. The copiers may work simultaneously. When the two carriages are displaced in the same direction, one of the copiers may be equipped with a roughing out tool and the other with a finishing tool. The two copiers may also be driven in reverse directions with their copying slides being equally inclined in different directions to the axis of the workpiece, so as to enable them to machine workpieces having several cylindrical portions of which the diameters increase starting from the ends and moving toward the central portion. Thus, the necessity of turning the workpiece is eliminated.

Finally, copying lathes equipped with one or several transversally or obliquely moving auxiliary tool slides are known. These auxiliary slides are perpendicularly displaceable with respect to the axis of the workpiece and carry tools having the form of the piece to be machined. These machines permit contours such as channels and necks, impossible to make with ordinary copying carriages, to be made. Certain lathes carry several copiers and one or several transversally or obliquely moving tool slides, the movements of which are controlled by automatic cycles. However, these machines are highly complex and are faced with the problems of encumberment due to the necessity of a large number of carriages.

The present invention proposes to increase the flexibility, the efficiency, and the simplicity of copying lathes equipped not only for machining workpieces which necessitate copying operations by longitudinally moving carriages, but also requiring transverse movements, and is particularly well adapted to lathes having two copiers.

The present invention provides a copying lathe characterized in that it comprises at least one combined copying assembly adapted for longitudinal transverse movements comprising a copying slide transversally or obliquely mounted on a set of slide bars and swivel mounted on a longitudinally displaceable carriage. The position of the copying slide is controlled in part by a first feeler means on the lathe cooperating, with a first contour of the piece to be reproduced which is fixed to the bed of the lathe and affecting, displacement of the carriage, and in part, by a second contour of the piece to be reproduced which is mounted adjacent a second feeler mounted on the slide which moves the slide by means which are independent of the means which longitudinally moves the carriage.

Due to the device which has just been described, standard equipment having a carriage and a swiveling transversally moving copying slide controlled by a feeler may be used for copying operations by longitudinal movement of the carriage and automatic transverse movements of the tool slide. This present combined copying assembly is particularly useful for auxiliary usage in conjunction with a standard-type principal copier to form an automatic lathe which may be easily adapted for many uses.

A more complete appreciation of the invention and many of the intended advantages thereof will be readily seen as the same becomes better understood by reference to the following description when considered in connection with the accompanying drawings wherein:

FIGS. 4, 5 and 6 show the combined assembly perpendicular to the axis of the workpiece, and respectively equipped for machining workpieces which have a convex or concave shape, outside grooves, and grooves on the interior of a bore;

FIG. 6a shows a schematic representation of a working cycle possible with the machine of FIG. 6.

Figure 1:
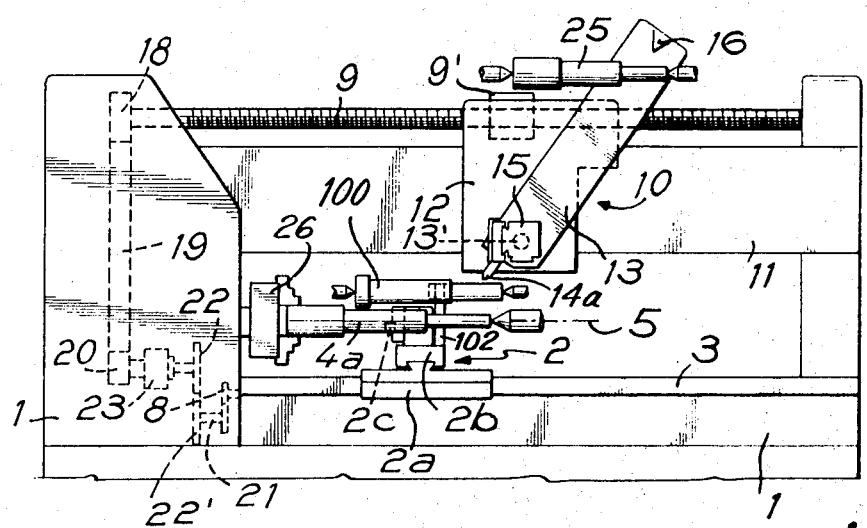
FIG. 1 shows in schematic a side view of a lathe having a combined assembly for performing copying operations and which is inclined in one direction.
Figure 2:
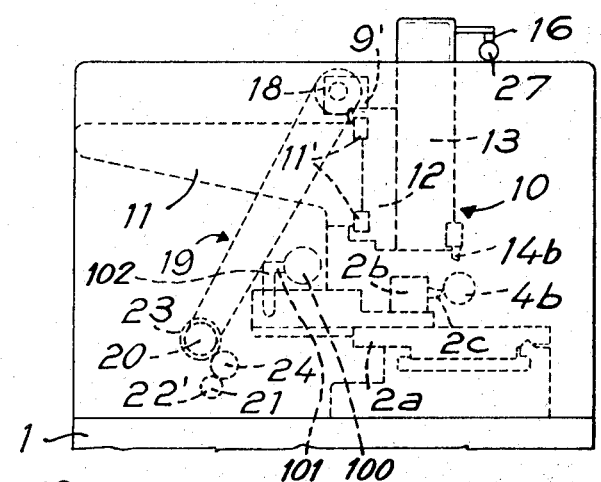
FIG. 2 is an end view of the device shown in FIG. 3.

In the examples shown in FIGS. 1 to 6, the same reference numerals are used to designate the same elements. In these FIGURES, the lathe includes a frame 1 on which is mounted a workpiece 4 (4a, 4b, 4c, 4d, 4e the letters a, b, c, d, e, corresponding respectively to the apparatus of FIGS. 1, 3, 4, 5, 6) by appropriate fixing and driving means, and a principal copier cooperating with a template, or a pattern piece (not shown, but the contour of which is to be copied).

The principal copier is a standard copier comprising a carriage 2a driven parallel to the axis 5 of the workpiece on the slide bars 3 and on which is mounted a copying slide 2b carrying a tool 2c. This slide 2b may be displaced in a direction which is transverse to the axis 5 and inclined on this displacement axis, toward the rear with respect to the tool 2c work-feeding direction.

The copier 2 includes a slow feed mechanism in the direction 6 for machining the workpiece, and a rapid return mechanism which moves the copying tool 2c in the direction of the arrow 7 to its starting position after the slide 2b has moved to its transverse starting position.

The principal copier 2 is moved in the direction of the arrows 6 and 7 by known kinematic chain drive means, and includes a pinion 8 in which the selection of the slow or rapid advance rates are actuated by clutches. These clutches are connected to a standard automatic cycle control lathe device operating the transverse movement of the tool, the work feed rate, the disengagement of the tool and the rapid return of the copying assembly 2 to the beginning of a working cycle.

In all of the FIGS. 1 to 6, a combined assembly 10 used for copying and transverse movements, mounted in a vertical plane above the axis 5 of the workpiece 4, is shown. It comprises a carriage 12 mounted on a bridge 11 connected to the frame 1, and guided by the rails 11' parallel to the axis 5, and is driven through means of a screw-threaded nut 9' parallel to the direction of the axis 5 by a horizontal screw means 9. The carriage 12 carries a copying slide 13 movable in a vertical plane in a direction transverse and oblique to the axis 5 of the workpiece 4. This slide 13 is provided with a tool 14 (14a, 14b, 14c, 14d, 14e), fixed in a toolholder 15. It further carries a feeler 16 schematically represented by a triangle at its upper extremity. The feeler 16 controls the displacement of the transverse slide 13 by, for example, means of a hydraulic circuit, and by consequence thus controls the distance of the tool 14 from the axis 5 of the workpiece 4.

The slide 13 is movable on a slide bar mounted on the carriage 12. This slide bar is pivotally mounted about an axis 13' fixed to the carriage 12. The carriage may thus be oriented in a direction which may be regulated with respect to the axis 5 of the workpiece. In particular, the slide may be oriented so as to be perpendicular to this axis, or in a direction which is inclined to the axis on one side or the other of the perpendicular position. In the present example, it is possible for the slide to occupy three positions, one perpendicular and the two others inclined to the axis 5 symmetrically disposed on either side of the first position. The pivoting slide bar may be fixed in these three positions by screws which are engaged in screw-threaded holes now shown in the drawing.

It is particularly advantageous to drive the carriage 12, i.e., by the rotation of the screw 9, through the same kinematic chain means used to drive the principal copier 2. To this effect, in a preferred mode of realization of the invention, the screw 9 carries at one of its ends a grooved pulley 18. This pulley is driven by a belt 19 mounted in a grooved pulley 20. The pulley 20 is connected to a shaft 21 of the kinematic chain drive through the intermediary of a pinions 22 and 22' and an electromagnetically controlled clutch 23. In FIG. 1, the shaft 21 also drives the pinion 8, and the clutch 23 allows the kinematic chain to be connected to the screw 9 when the combined assembly 10 is in the desired position in front of the workpiece 4.

In the example of FIG. 1, the kinematic chain can drive the copier 2 and the combined assembly 10 in the same direction as that of the work feed or the rapid return. The FIGS. 2 and 3, to the contrary, show a device in which the copier 2 and the combined assembly 10 move in opposite directions, parallel to the axis 5, through the means of an inversion pinion 24 added between the shaft 21 and the pinion 22' before the clutch 23.

It is clear that by changing the ratio between the pinions 22 and 22' placed between the shaft 21 and the clutch 23, the advancing speed of the combined assembly 10 may be modified with respect to that of the principal copier 2.

As shown in FIG. 1, the slide 13 is inclined with respect to the axis 5 of the workpiece 4a on the same side as that of the slide 2b of the principal copier 2, i.e., toward the rear, with respect to the slow feed direction of the two copiers.

The feeler 16 of the combined assembly 10 is adapted to engage a pattern piece 25 fixed to the frame 1. The contour of this pattern piece being such that the diameters increase in the direction of the working longitudinal movement of the copier 2.

The workpiece to be machined 4a is held by its largest end in the jaws of a mandrel 26, and the coordinated operation of the copier 2 and the combined assembly 10 permits the workpiece 4a to be machined more rapidly. For example, the principal copier 2 may perform the roughing out operations and the combined assembly 10 may perform the finishing operations, immediately after the last roughing out operation.

Figure 3:
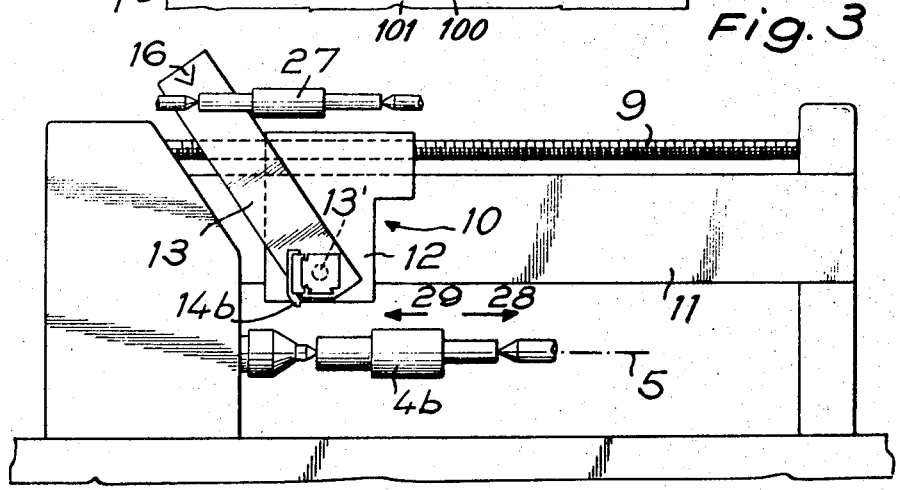
FIG. 3 is similar to that of FIG. 1 but in which the combined assembly is inclined in the reverse direction.

In the device of FIG. 3, the copier 2 and the combined assembly 10 are driven in opposite directions, and the copying slide 13 is inclined to the axis 5 of the workpiece to be machined 4b on the side of the workpiece opposite to that of the copying slide 2b with respect to a perpendicular plane passing through this axis. The two slides 2b and 13 are inclined toward the rear with respect to their respective directions of work feed.

This device is interesting, because the copying tool 14b in the slide 13 may be fed into the workpiece 4b at the end opposite to the end where the tool 2c of the principal copier 2 is fed into the workpiece.

The feeler 16 of the copying slider 13 is adapted to engage a pattern piece 27 fixed to the frame 1 and when the carriage 12 is provided with a slow feeding movement in the sense of the arrow 28, the principal copier 2 may be provided with a slow feed in the direction of the arrow 29. In practice, the piece to be machined is often thinner at its end than at its center, and the disposition which has just been described allows the turning time in the lathe to be considerably reduced for this type of piece by simultaneously machining the two extremities of the workpiece 4b.

However, in this particular case, the two extremities of the workpiece 4b must be disengaged to allow their two sides to be simultaneously machined. This excludes the utilization of holding jaws such as 26. Therefore, in place of these, a known device (not shown) is used to hold and to rotate the workpiece. This device includes jaws placed in one of the end faces of the workpiece 4.

In the previous two positions of the slide 13, the simultaneous or selective utilization of the copier 2 and the combined assembly 10, in connection with the automatic control cycle of the lathe, is produced by a known step-by-step device and electrical contacts controlled by a shaft having raised portions thereon.

In one mode of realization of this device, in which the longitudinal movement of the vertical copier 10 must always be less than to that of the horizontal copier 2, the horizontal copier 2 carries a bistable electric contact (not shown) which when operated actuates the clutch 23 and thus causes the carriage 12 to be driven by the screw 9.

The synchronization of the movements of the two carriages 2a and 12 is caused by a plurality of raised portions or switches fixed to the bed of the lathe and disposed on the path of the preceding contact. The first raised portion encountered by the copier 2 during the course of the longitudinal movement of the carriage causes the clutch to be actuated, and upon contacting the second raised portion the latter is disengaged.

Enlarged or raised portions of the type described above may also be used for the rapid return of the two carriages.

As shown in FIGS. 4, 5 and 6, the slide 13 and the combined assembly 10 is perpendicularly disposed to the axis 5 of the workpiece 4 and is vertically movable in this direction.

The slide 13 of FIG. 4 is provided with a cutting tool 14c whose centerline is also perpendicular to the axis 5. The feeler 16 cooperates with a pattern piece 30 fixed to the frame 1 and contains a convex contour 30'. When the feeler 16 is in contact with the pattern piece 30 and the carriage 12 begins its longitudinal feeding movement, the contour 30' of the pattern piece 30 is reproduced on the workpiece 4c. The carriage may be longitudinally moved by means of the kinematic chain and with the synchronization already described, in the direction of the arrow 31 as well as in the direction of the arrow 32.

The combined assembly 10, as it has already been described, allows the machining of convex contours as well as concave contours, and may be used to continuously repeat these operations. In combination with the principal copier 2, it allows pieces having a spherical shape to be produced.

In the three examples given above, the pattern piece fixed to the frame is copied by the combination of the longitudinal feed of the carriage 12 and the transverse or oblique movement of the slide 13 of the combined assembly 10, which was used as an auxiliary copier with a pattern piece fixed to the frame.

FIG. 5 illustrates the utilization of the combined assembly 10 in transverse movement for the forming of necks or of grooves. The possibility of using the same combined assembly 10 for standard copying operations or for transverse movement is offered in the present invention, by the simple adaptation of the control contours cooperating with the feeler in a manner so as to produce the desired operations.

For transverse movement of the combined assembly 10, the carriage 12 is driven by the screw 9 into a position against the workpiece 4d at right angles to the neck or groove 33 to be machined, and is stopped in this position. The tool 14d has the same form as the contour of the neck or groove 33 to be produced. It is not possible to automatically machine this neck 33 by copying the contour of a pattern piece fixed to the frame during the longitudinal movement of the carriage 12. For controlling the transverse movement of the tool, the feeler 16 is applied against a cam 35 carried by the carriage 12. This cam 35 is mounted so as to rotate around a horizontal axis 36 mounted on a removable support 37 fixed to the slide bar pivoting about the axis 13' on which is mounted the slide 13. The cam is driven by the means of an electric motor 38 through the intermediary of an endless screw 39 connected to a speed-reducing gear train 40 having the cam 35 fixed to the end thereof.

The axis of rotation 36 of the cam 35 is placed on the feed axis of the feeler 16 of the slide 13, so that when the feeler 16 comes in contact with the cam 35, the transverse movement of the slide will be stopped. When the cam 35 begins to rotate, the decrease in its radius at the point of contact with the feeler 16 controls the movement of the copying slide 13 to a depth determined by the contour of the cam itself and at a speed which depends on the contour of the cam 35 and on its speed of rotation. Thus, the movement of the slide 13 is always controlled by the feeler 16 and only the control contour needs to be modified when a different operation is desired. As shown, the pattern piece fixed to the frame has been replaced by the cam rotatably mounted on the carriage.

On each rotation of the cam 35, as the cam returns to its initial starting position, and, before the cam reaches this position, the increase in the radius of the cam acts to actuate the feeler 16 causing the return of the slide 13d and the disengagement of the tool 14d.

As stated above, the cam 35 is removable and it may be replaced by a cam having any desired contour. Also, the reduction ratio of the gear train 40 may be changed by replacing the gears, so as to regulate the size of the neck 33 and the transverse feed of the tool 14d. The start of the rotation of the cam 35 is determined by the lathe automatic cycling means which controls the electric motor 38.

This control is similar to that of a standard transversally moving carriage. The control motor 38 is excited by a contact which is operated by a raised starting portion or during the copying cycle of the principal copier 2. The motor 38 is then cut off after one turn around the axis 36 of the cam 35 by a raised portion carried by this cam and which in turn operates an interrupting contact.

FIG. 6 shows the combined assembly 10 having the same means as mentioned above such as the support 37 with a cam 35, but which carries a different tool 14e with which it is possible to machine an interior groove 41 provided in a bore 42 of a workpiece 4e held in a mandrel 43 by one end. The tool 14e is fixed in a direction perpendicular to the tools mentioned above, on a tool holder 15 carried on a second dovetail, which is perpendicular to the dovetail which is employed for the tools mentioned above.

In this movement, only the machining phase itself is controlled by the cam 35 cooperating with the feeler 16.

The automatic cycle of the lathe is carried out in a manner which can be shown as a square working cycle such as schematically shown in FIG. 6a, wherein the unbroken arrows illustrate the movement of the tool 14e from its starting point to the end of the machining, and the arrows shown in broken lines trace the return movement of this tool 14e. The operation of machine is as follows:

The slide 13 of FIG. 6 is shown as being in the withdrawn starting position. In this position the automatic cycle control causes the excitation of an electromagnet 45 acting against the lever of the feeler 16, which causes the slide 13 to be fed in a transverse direction toward the piece to be machined until the feeler 16 comes in contact with the control cam 35 therefore stopping the transverse movement of the slide 13. The screw 9 is then coupled by means of the clutch in the sequence of the steps of the automatic cycle, and the carriage 12 is moved until the tool 14e enters into the bore 42. The automatic cycle then causes the disconnection of the screw 9 at the exact position where the tool 14e is to machine the groove 41, and at the same time, the cam is operated by the motor 38 so as to transversely move the tool 14e and thereby machine the groove 41. Then the tool 14e is disengaged from the groove 41, at the end of the machining thereof, the automatic cycle rapidly returns the copier to its starting position.

It is obvious that the combined assembly 10 may be easily adapted so as to realize any of the modifications shown in FIGS. 1 to 6. This is done by merely changing the tool and replacing the support 37 of the cam 35 by a pattern piece 30 fixed to the frame or vice versa. In the same way, the modification of the inclination of the slide 13 is easily effected. These operations merely take a small period of time at the start of the machining of a new series of workpieces.

In the two examples illustrated in FIGS. 5 and 6, it has been assumed that the slide 13 was orientated perpendicularly to the axis 5 of the workpiece, i.e., movable in a vertical direction. It is also possible to use the combined assembly 10 so as to move in a transverse direction with the slide 13 inclined to the axis 5. This arrangement is extremely useful for machining angles and for the oblique movement of tools, with tools having special forms, the machining of certain contours, such as neck, cuts, and grooves on the external surface of the workpiece or the interior of a bore, when the front parts of the contours are inclined at a sharp angle to the adjacent cylindrical portions. As set forth above in the examples given in FIGS. 5 and 6, the cam 35, driven by the motor 38, will control the oblique movement of this slide 13. Since the support 37 is fixed to the pivoting slide bar of the slide 13, the cam 35 is always in a suitable position with respect to the feeler 16, regardless of the position of the slide, i.e., the axis 36 stays on the path of the feeler.

The preceding description shows how the flexibility, the speed of utilization and the efficiency of a lathe may be increased by the addition of a combined assembly, such as 10, provided with the improvements mentioned above.

The feeler of the slide of the combined assembly may be associated with highly varied control contour means for copying by means of a longitudinally movable carriage, and with contour means mounted on the carriage and which allow the utilization of transversally moving tools either at right angles or obliquely to the axis of the piece to be machined. This combined assembly is associated with a lathe automatic cycle control.

This equipment may be easily adapted for different machining operations on other workpieces by simply changing the tool, the pattern piece, the cam for transverse movement of the slide, the reduction ratio of the gear train controlling the feed of the longitudinal movement or the rotation of the transverse movement controlling cam.

Finally, the longitudinal movement of the combined assembly by the same kinematic chain which moves the principal copier is a factor which simplifies construction of a new lathe. The same driving means allows the feed of the two carriages to be synchronized when the combined assembly is used for precision copying due to the utilization of a clutch, without notably increasing the mechanical complexity of the assembly.

The coordination of the movement of the two carriages is also carried out in a very simple manner, by action of the clutch under the effect of an order given by the displacement of the principal copier.

It is also obvious that this coordination and the driving or the control of the combined assembly may be carried out by any other well-known means which may be independent from the kinematic chain drive means used on the principal copier.

What is claimed is:

1. An assembly for a lathe to machine a workpiece mounted thereon in accordance with the contour of a piece to be reproduced comprising a first carriage mounted on said lathe in a vertical plane above said workpiece, means for moving said first carriage parallel to the longitudinal axis of said workpiece, a second carriage mounted on said lathe in the same general horizontal plane as said workpiece, means for moving said second carriage longitudinally in said horizontal plane parallel to said workpiece, a tool-carrying slide movable on said second carriage in a horizontal direction transverse to the axis of said workpiece and in operative contact with a first template of a piece to be reproduced, means connecting said first carriage moving means and said second carriage moving means for cooperative movement between said first and second carriages, a swiveling slide carrying a tool assembly slidably mounted on said first carriage and adapted for vertical movement independently of said first carriage movement relative to said workpiece in a direction which is transverse to the longitudinal axis of said workpiece; a feeler element on said slide assembly, a second template of the piece to be reproduced positionable adjacent said feeler element and means operatively connected to said feeler element to move said slide assembly in said separate transverse movement when said feeler element is brought into contact with said second template, wherein said second template comprises a rotatable cam, said cam being removably mounted on said first carriage and means also removably mounted on said first carriage to rotate said cam when said feeler element on said slide assembly is brought into contact with said cam, said cam being positionable on said first carriage on the axis of the path of transverse movement of said slide assembly.

2. The assembly according to claim 1 wherein the cam is rotated by a gear reducer having interchangeable gears driven by an electric motor.

3. The assembly according to claim 2 wherein the cam carries at least one raised portion which operates so as to interrupt the rotation of the said motor when the slide assembly has completed one advancing and returning operation.

4. The assembly according to claim 3 further comprising electromagnetic means to operatively engage said swiveling slide assembly to selectively move said feeler element into contact with said cam.

5. The assembly according to claim 4 wherein the controls for the longitudinal and transverse movements of said assembly, the electric motor and the electric magnet are connected to said automatic cycle control means on said lathe whereby said assembly is moved in a manner which follows a square working cycle.

6. A copying lathe comprising a frame on which is mounted a workpiece to be machined in accordance with a first template which is fixedly mounted on said frame, a principal copier mounted on said frame in the same general horizontal plane as the workpiece and comprising a first carriage adapted for longitudinal movement in said horizontal plane parallel to said workpiece, a first tool-carrying slide movable on said first carriage in a horizontal direction transverse to the axis of said workpiece and feeler means on said copier cooperating with said first template to control the means for moving said principal copier in said transverse direction and at least one auxiliary copying assembly mounted on said lathe in a vertical plane above said workpiece, said assembly comprising a second carriage movably mounted on said lathe and operatively connected to the principal copier driving means to cause said second carriage to move parallel to the longitudinal axis of the workpiece in accordance with a second swiveling tool-carrying slide assembly slidably mounted on said second carriage and adapted for vertical movement independently of said second carriage movement relative to said workpiece in a direction which is transverse to the longitudinal axis of said workpiece, a feeler element on said second slide assembly, a second template of the piece to be reproduced positionable adjacent said second slide assembly feeler element and means operatively connected to said feeler element to move said slide assembly in said separate transverse movement when said feeler element is brought into contact with said second template, wherein said second template comprises a rotatable cam, said cam being removably mounted on said second carriage and means also removably mounted on said second carriage to rotate said cam when said feeler element on said second slide assembly is brought into contact with said cam, said cam being positionable on said second carriage on the axis of the path of transverse movement of said second slide assembly.

7. The copying lathe according to claim 6 wherein the cam is rotated by a gear reducer having interchangeable gears driven by an electric motor.

8. The copying lathe according to claim 7 wherein the cam carries at least one raised portion which operates so as to interrupt the rotation of the said motor when the second slide assembly has completed one advancing and returning operation.

9. The copying lathe according to claim 6 further comprising electromagnetic means to operatively engage said second slide assembly to selectively move said feeler element into contact with said cam.

10. The copying lathe according to claim 9 wherein the controls for the longitudinal and transverse movements of said second assembly, an electric motor for driving said cam and the electric magnet are connected to an automatic cycle control means on said lathe whereby said second assembly is moved in a manner which follows a square working cycle.

* * * * *